United States Patent [19]
Stokes

[11] Patent Number: 4,835,840
[45] Date of Patent: Jun. 6, 1989

[54] METHOD OF MAKING AN IMPROVED DISC ROTOR ASSEMBLY

[75] Inventor: Vijay K. Stokes, Schenectady, N.Y.

[73] Assignee: General Electric Company, Schenectady, N.Y.

[21] Appl. No.: 87,285

[22] Filed: Aug. 20, 1987

Related U.S. Application Data

[62] Division of Ser. No. 874,908, Jun. 16, 1986, Pat. No. 4,704,555.

[51] Int. Cl.$^4$ ............................................. H02K 15/02
[52] U.S. Cl. ...................................... 29/598; 264/263; 264/272.2; 264/274; 310/42; 310/43; 310/156; 310/268
[58] Field of Search ................. 310/268, 237, 43, 156, 310/42, 91, 71, 45, 218; 29/598, 602, 607; 264/272.19, 272.2, 263, 274

[56] References Cited

U.S. PATENT DOCUMENTS

| | | | |
|---|---|---|---|
| 2,490,021 | 12/1949 | Aske | 310/268 UX |
| 3,320,453 | 5/1967 | Kober | 310/268 |
| 3,538,365 | 11/1970 | Reisnecker | 310/237 |
| 4,206,379 | 6/1980 | Onda | 310/43 |
| 4,339,873 | 7/1982 | Kanamaru | 310/42 |
| 4,420,875 | 12/1983 | Coquillart | 310/43 |

FOREIGN PATENT DOCUMENTS

| | | | |
|---|---|---|---|
| 2018808 | 11/1971 | Fed. Rep. of Germany | 310/268 |
| 0954771 | 8/1964 | United Kingdom | 310/43 |
| 2052319 | 1/1981 | United Kingdom | 29/598 |

Primary Examiner—R. Skudy
Attorney, Agent, or Firm—William A. Steinberg; James C. Davis, Jr.; Paul R. Webb, II

[57] ABSTRACT

A disc rotor assembly includes a ring of magnetic flux conducting material having a ring-shaped magnetizable body fastened thereon. The magnetizable body includes a flat, axially facing, ring-shaped rotor surface for opposing a stator in an electric motor. The disc rotor assembly further includes a shaft disposed coaxially therewith, and a matrix molded between the ring and the shaft.

9 Claims, 4 Drawing Sheets

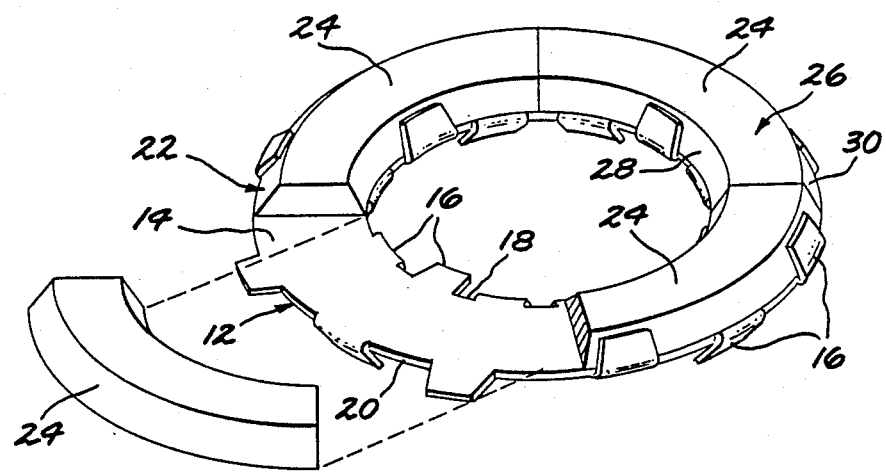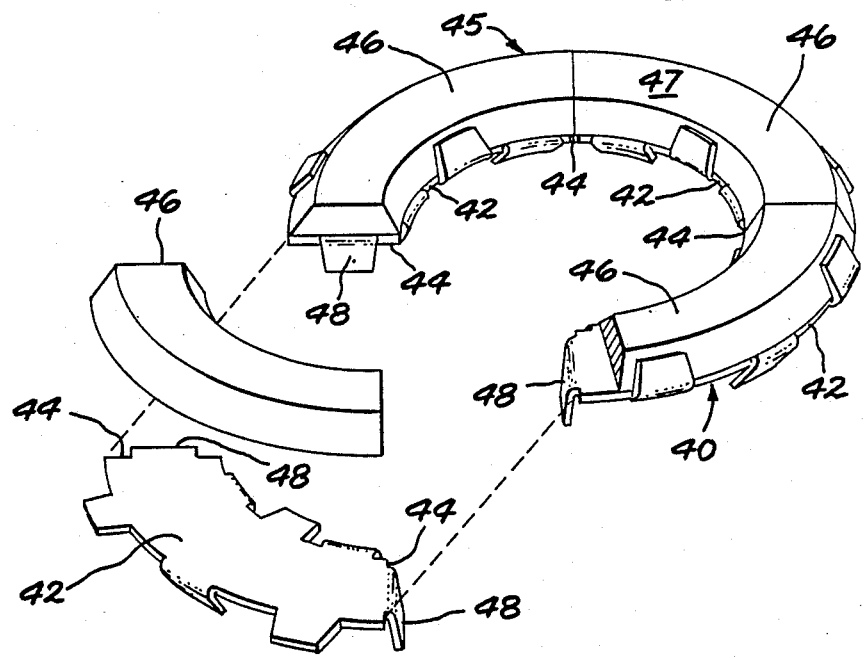

METHOD OF MAKING AN IMPROVED DISC ROTOR ASSEMBLY

This application is a division of application Ser. No. 874,908, filed 6/16/86 now U.S. Pat. No. 4,704,555.

This invention relates generally to electric motors and more specifically to a disc rotor assembly for an electric motor and a method of making the same.

BACKGROUND OF THE INVENTION

Electric motors of the type commonly referred to as disc motors use a lateral face of a rotor assembly as an active magnetic surface. Such motors have application, for example, in disc drives for magnetic storage devices.

A cost savings in the manufacture of such motors would provide a substantial improvement in the art. Of particular interest would be a method which economically provides a disc rotor assembly having a rotor surface flattened to a high degree of tolerance. Accordingly, this invention is directed to providing an economical rotor assembly, and a method of manufacturing the same.

OBJECTS OF THE INVENTION

A principal object of the present invention is to provide a new and improved disc rotor assembly.

Another object of the present invention is to provide a new and improved method for manufacturing a disc rotor assembly.

A further object of the present invention is to provide a disc rotor assembly which can be economically manufactured using conventional techniques and materials.

Yet another object of the present invention is to provide a method for manufacturing a disc rotor assembly whereby a magnetizable rotor surface can be economically flattened to a high tolerance.

SUMMARY OF THE INVENTION

A new and improved disc rotor assembly includes a ring of magnetic flux conducting material having an axially facing surface. A ring-shaped magnetizable body is fastened on the surface of the ring and includes a substantially flat, axially facing, ring-shaped rotor surface for opposing a stator in an electric motor. The disc rotor assembly further includes mounting means, such as a shaft, for providing an axis of rotation for the assembly, and a matrix disposed between the ring and the mounting means for relatively fastening the two.

A new and improved method of manufacturing the disc rotor assembly described above includes the use of a mold having a flat surface machined to a high degree of tolerance. The magnetizable body is mounted on the flux ring, and the rotor surface of the magnetizable body is situated on the flat surface of the mold. The mounting means is situated in a selected position relative to the flux ring and magnetizable body, and a matrix is molded between the various elements to maintain their relative positions.

BRIEF DESCRIPTION OF THE FIGURES

While the specification concludes with claims defining the features of the invention that are regarded as novel, it is believed that the invention, together with further objects thereof, will be better understood from a consideration of the following description in conjunction with the drawing figures, in which:

FIG. 3 illustrates a partially exploded perspective view of the flux ring and magnetizable bodies of FIGS. 1 and 2;

FIG. 4 illustrates a partially exploded perspective view of a flux ring and magnetizable body segments constructed in accordance with a second embodiment of the invention;

DETAILED DESCRIPTION OF THE INVENTION

Figure 1:
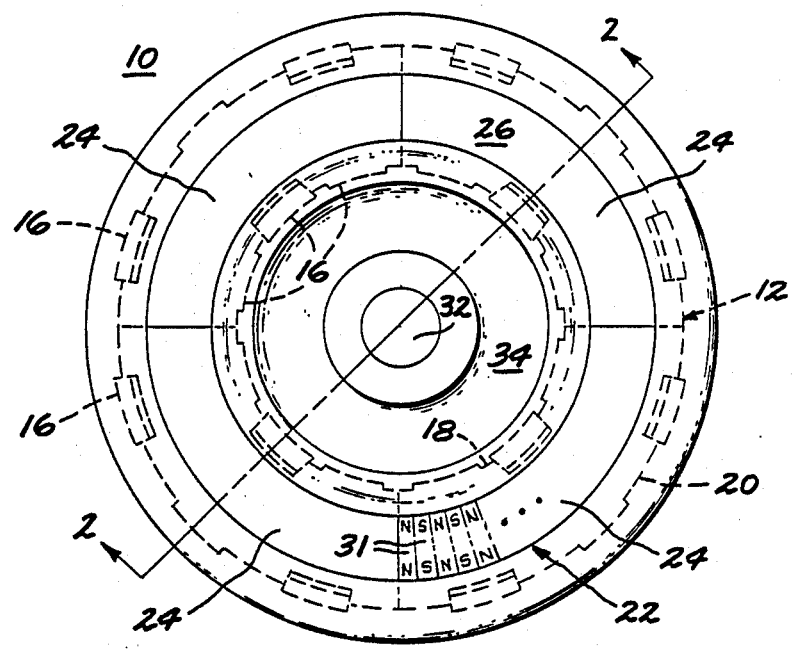
FIG. 1 illustrates a front view of a disc rotor assembly constructed in accordance with a first embodiment of the present invention.
Figure 2:
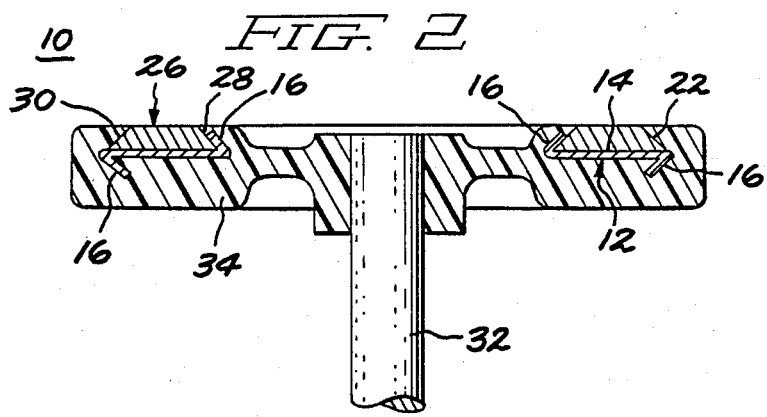
FIG. 2 illustrates a sectional view taken along line 2—2 of FIG. 1.

Referring now to FIGS. 1, 2 and 3, a disc rotor assembly 10 is shown comprising a generally circular ring 12 of magnetic flux conducting material. Ring 12 which includes a plurality of bendable tabs comprises, for example, iron, and is preferably stamped from sheet metal. As is best shown in FIG. 3, ring 12 is generally flat and includes an axially facing surface 14, a radially inner edge 18 and a radially outer edge 20. Twenty-four bendable tabs 16 are disposed about ring 12, twelve tabs adjoining radially inner edge 18 and twelve tabs adjoining radially outer edge 20. A ring shaped magnetizable body 22, comprising four adjoining, arcuate body segments 24, is fastened on ring surface 14 via bendable tabs 16, twelve of the tabs being positioned to engage the body segments. An optional adhesive (not shown) can be disposed between magnetizable body 22 and ring surface 14, in addition to or in lieu of tabs 16, for securing the body to the ring. Body 22 includes a substantially flat, axially facing rotor surface 26, which in the embodiment of the invention shown in FIG. 1 is situated substantially in registry with ring surface 14. Each body segment 24 includes radial edges 28 and 30, these edges preferably being chamfered in the manner illustrated for securely engaging tabs 16. In a manner well known to those skilled in the art, magnetizable body 22 includes a plurality of alternating North-South pole segments 31 (FIG. 1). Each segment 31 extends radially across surface 26 of magnetizable body 22.

Further included in disc rotor assembly 10 is a shaft 32 disposed generally coaxially with ring 12 and magnetizable body 22, and a matrix 34 disposed between the ring and the shaft for securing the ring to the shaft. (Shaft 32 and matrix 34 are shown only in FIGS. 1 and 2). Matrix 34 is disposed so as to engage twelve of bendable tabs 16, and so as to leave exposed rotor surface 26. As shown in FIGS. 1 and 2, matrix 34 preferably extends at least partially over radial edges 28 and 30 of magnetizable body 22 to better secure the body to assembly 10. Matrix 34 preferably comprises an easily molded material such as the plastic phenolic, and shaft 32 preferably comprises a metal such as steel. Shaft 32 optionally includes radially extending splines (not shown) for better engaging matrix 34.

In operation, disc rotor assembly 10 is employed in an electric motor (not shown) having a stator surface spaced from rotor surface 26. In a manner well known to those skilled in the art, disc rotor assembly 10 is rotated about the axis of shaft 32. Disc rotor assembly 10 provides the substantial advantages of light weight, economical construction, high strength, and, as will be described in more detail below, a very flat rotor surface 26.

FIG. 4 shows an alternate embodiment of a flux ring 40 wherein the ring comprises four arcuate segments 42 adjoining at their ends 44. A magnetizable, ring-shaped body 45 comprising four segments 46, identical to segments 24 of FIGS. 1–3, is fastened in registry with the surface of each ring segment 42 so as to form a flat rotor surface 47. Each ring segment 42 preferably includes a bendable tab 48 adjoining its ends 44 for engaging a matrix (not shown). It will thus be appreciated that, except for the construction of flux ring 40 from adjoining flux ring segments 42, flux ring 40 and magnetizable body 45 are otherwise identical in construction and function to flux ring 12 and magnetizable body 22 of FIGS. 1–3. An advantage of constructing flux ring 40 from segments 42, which will be discussed in more detail below, is that the segmented construction permits rotor surface 47 to be easily disposed in a flat plane.

Figure 5:
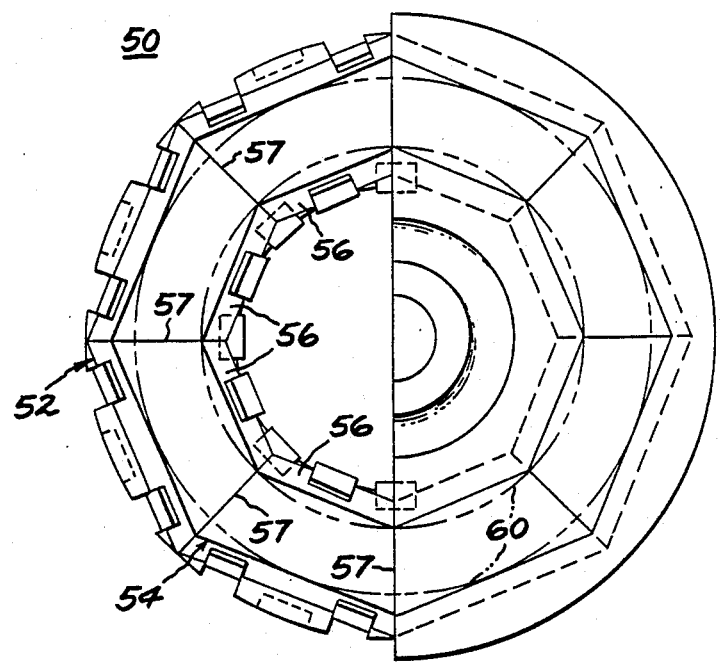
FIG. 5 illustrates a partially cut-away front view of a disc rotor assembly constructed in accordance with a third embodiment of the invention.

FIG. 5 illustrates a disc rotor assembly 50 including yet another embodiment of a flux ring 52 and a magnetizable body 54. In this embodiment of the invention magnetizable body 54 comprises eight trapezoidal segments 56 adjoining at their ends 57 such that the resultant magnetizable body is polygonal in shape. Flux ring 52 can comprise a single ring of the type shown in FIGS. 1–3 shaped to accommodate trapezoidal magnetizable body segments 56, or adjoining flux ring segments of the type shown in FIG. 4. Further, flux ring 52 can be generally circular in shape as shown, or polygonal, and include appropriately shaped segments if a segmented ring is selected. In either case, disc rotor assembly 50 includes an axially facing, ring shaped, flat rotor surface situated between dashed lines 60.

It will be understood that, with the exception of the shape of magnetizable body 54, disc rotor assembly 50 is otherwise identical in construction and function to those embodiments of the invention described hereinabove in FIGS. 1–4. Because trapezoidal magnetizable body segments 56 are more economical to construct than the arcuate magnetizable body segments shown hereinabove (i.e., segments 24 of FIGS. 1–3 and segments 46 of FIG. 4), rotor assembly 50 provides the advantage of being relatively more economical to construct than those embodiments of the invention shown in FIGS. 1–4.

Figure 6:
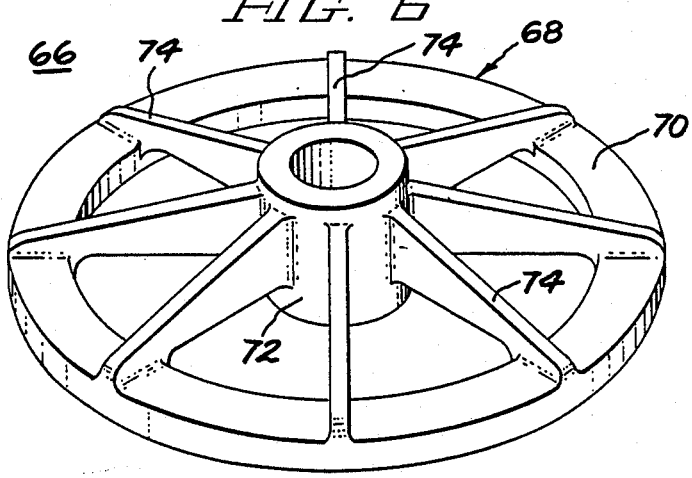
FIG. 6 illustrates a back perspective view of a disc rotor assembly constructed in accordance with a fourth embodiment of the invention.

FIG. 6 shows another embodiment of the invention wherein a disc rotor assembly 66 includes a spider hub type spoked matrix 68 comprising, for example, an easily molded plastic such as phenolic. Matrix 68 includes an outer ring portion 70 for supporting a flux ring and magnetizable body of the type shown hereinabove (not visible in FIG. 6), and a concentric inner ring portion 72 for accommodating a shaft (not shown). Inner and outer ring portions 72 and 70 are connected by eight, regularly spaced, radially extending spokes 74. Matrix 68 presents the advantage of being relatively light in weight in comparison to matrix 34 of FIGS. 1–2. It will be appreciated by those skilled in the art that matrix 68 is but one alternate matrix configuration, and many different matrix configurations can be used which would similarly function to fasten a flux ring and magnetizable body to a shaft.

Figure 7:
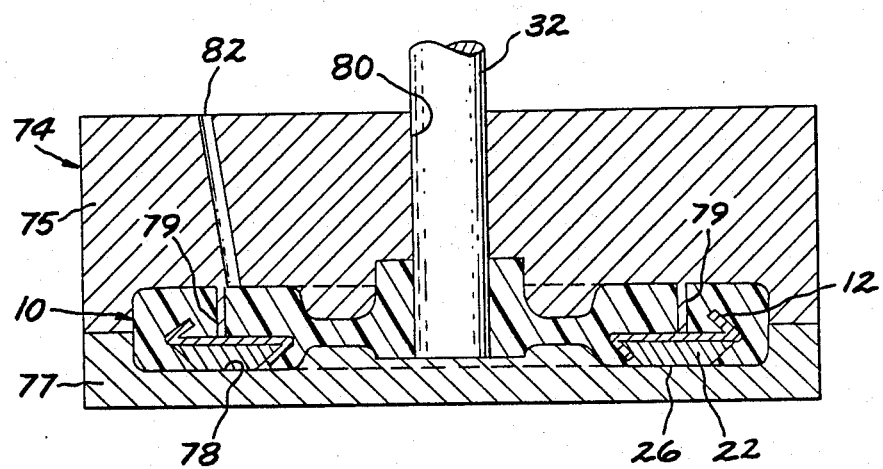
FIG. 7 illustrates a side sectional view of apparatus for constructing a disc rotor assembly in accordance with a method of the present invention.

FIG. 7 illustrates a mold 74 used in constructing a disc rotor assembly in accordance with the present invention. For purposes of illustration, an exemplary mold 74 is shown shaped to manufacture disc rotor assembly 10 of FIGS. 1–2. Mold 74 comprises upper and lower halves, 75 and 77, respectively. In accordance with the present method, mold lower half 77 includes a flat surface 78 machined to a high degree of tolerance. In constructing disc rotor assembly 10, magnetizable body 22 is fastened to flux ring 12 in the manner described hereinabove. Magnetizable body 22 and ring 12 are then situated in mold 74 such that rotor surface 26 is adjoining mold surface 78. Mold 74 preferably includes braces 79, for example comprising extensions of mold upper half 75, for biasing rotor surface 26 against mold surface 78 in the manner illustrated. Rotor surface 26 is thereby flattened to substantially the same degree of accuracy and tolerance as mold surface 78. Shaft 32 is disposed coaxially with magnetizable body 22 and ring 12 via an aperture 80 in mold 74, and a matrix material such as a plastic is introduced into mold 74 via an aperture 82. Magnetizable body 22 is subsequently magnetized, preferably as the final step in the construction of rotor assembly 10, to provide pole segments 31 shown in FIG. 1 above.

It will be understood that the process described with respect to FIG. 7 above is substantially identical when implemented using a segmented flux ring such as that shown in FIG. 4, or trapezoidal magnetizable body segments of the type shown in FIG. 5. The use of the segmented flux ring versus the unitary flux ring provides the further advantage of making rotor surface 26 relatively easier to flatten against mold surface 78 because the multiple segments are flexible relative to one another.

There are thus provided multiple embodiments of a disc rotor assembly which are light in weight, high strength, and economical to construct. Further provided is a method of manufacturing such disc rotor assemblies which can be economically implemented using conventional materials and technologies, and which provides a disc rotor assembly having a rotor surface flattened to a high degree of tolerance.

While a preferred embodiment of the invention has been illustrated and described, it will be clear that the invention is not so limited. Numerous modifications, changes, variations, substitutions and equivalents will occur to those skilled in the art without departing from the spirit and scope of the present invention. For example, while the embodiments of the invention shown herein include a shaft for providing an axis of rotation, it will be understood that the invention is not so limited. Other structure providing an axis of rotation, including for example a bearing ring, could be substituted therefor. Further, the position and quantity of bendable tabs can be selected to achieve the desired result. Accordingly, it is intended that the invention herein be limited only by the scope of the appended claims.

What is claimed is:

1. A method of manufacturing a disc rotor assembly comprising the steps of:
   providing a ring of magnetic flux conducting material including an axially facing surface, said ring of magnetic flux conducting material comprising a plurality of adjoining arcuate segments;

fastening to said ring surface a generally ring shaped magnetizable body having a substantially flat and axially facing ring shaped rotor surface, said magnetizable body comprising a plurality of adjoining arcuate magnetizable body segments, each of said magnetizable body segments being disposed on one of the arcuate segments of said ring of magnetic flux conducting material;

providing a mold including at least one flat surface;

placing said ring of magnetic flux conducting material and said magnetizable body in said mold such that said rotor surface is adjoining the flat surface of said mold; and molding a matrix in said mold about said ring and said magnetizable body.

2. The method of claim 1 and further comprising the steps of:

providing a mounting means for providing an axis of rotation for said disc rotor assembly;

positioning said mounting means, before said molding step, in a selected position relative to said ring of magnetic flux conducting material and said magnetizable body; and molding said matrix about said mounting means.

3. The method of claim 1 wherein said matrix comprises a plastic.

4. The method of claim 1 wherein each of the adjoining arcuate segments of said ring of magnetic flux conducting material and each of the magnetizable body segments is generally trapezoidal in shape such that the arcuate segments of said ring of magnetic flux conducting material and the arcuate magnetizable body segments are each polygonal in shape.

5. The method of claim 2 wherein said mounting means comprises a shaft disposed coaxially with said ring of magnetic flux conducting material.

6. The method of claim 1 wherein said step of providing said ring of magnetic flux conducting material is performed by stamping said ring from sheet metal.

7. The method of claim 6 wherein said stamping step further comprises stamping a plurality of bendable tabs on said ring of magnetic flux conducting material for engaging said magnetizable body and said matrix.

8. The method of claim 1 wherein each of said magnetizable body segments is generally trapezoidal in shape such that said magnetizable body is polygonal in shape.

9. The method of manufacturing a disc rotor assembly comprising the steps of:

providing a plurality of arcuate magnetic flux conducting segments;

adjoining said magnetic flux conducting segments to form a ring including an axially facing surface;

providing a plurality of arcuate magnetizable body segments;

fastening one of said magnetizable body segments to each of said magnetic flux conducting segments so as to provide a substantially flat and axially facing ring-shaped rotor surface;

providing a mold including at least one flat surface;

placing said ring with said fastened magnetizable body segments in said mold such that said rotor surface is adjoining said flat surface;

positioning mounting means for providing an axis of rotation for said disc rotor assembly in a selected position relative to said ring; and molding a matrix in said mold about said ring, said mounting means, and said magnetizable body.

* * * * *